United States Patent [19]

Smith et al.

[11] Patent Number: 5,262,482
[45] Date of Patent: Nov. 16, 1993

[54] POLYMER COMPOSITIONS USEFUL AS FLOW AIDS, AND COATING COMPOSITIONS CONTAINING THE POLYMER COMPOSITIONS

[75] Inventors: Marc L. Smith, Highland; Geoffrey R. Holzrichter, Riverside; Edward J. Holzrichter, Redlands; Leslie P. Walkeapaa, Riverside, all of Calif.

[73] Assignee: Morton Coatings, Inc., Chicago, Ill.

[21] Appl. No.: 728,853

[22] Filed: Jul. 11, 1991

Related U.S. Application Data

[60] Continuation of Ser. No. 498,014, Mar. 23, 1990, abandoned, which is a division of Ser. No. 272,073, Nov. 16, 1988, abandoned.

[51] Int. Cl.⁵ .............................................. C08L 67/02
[52] U.S. Cl. .................................... 525/176; 525/212; 525/221
[58] Field of Search ..................... 525/176, 212, 221

[56] References Cited

U.S. PATENT DOCUMENTS

| | | | |
|---|---|---|---|
| 3,366,590 | 1/1968 | Taft | 526/318 |
| 4,089,828 | 5/1978 | Vasishth et al. | 526/318 |
| 4,276,212 | 6/1981 | Khanna et al. | 260/39 R |
| 4,339,365 | 7/1982 | Becker et al. | 525/386 |
| 4,388,445 | 6/1983 | Sugiura et al. | 525/176 |

*Primary Examiner*—Bernard Lipman
*Attorney, Agent, or Firm*—Robert M. Didrick

[57] ABSTRACT

The present invention relates to polymer compositions which are useful particularly as flow aids in coating resin formulations. In one embodiment, the polymer composition is prepared by reacting (A) at least one acrylic ester, vinyl monomer or mixtures thereof, provided the acrylic ester is not a hydroxyalkyl acrylate, (B) at least one monoester of an alpha-beta unsaturated dicarboxylic acid, and (C) at least one hydroxy-containing compound selected from hydroxyalkyl acrylates and compounds characterized by the formula $$\text{HOR*SH} \qquad \text{(IIIA)}$$

wherein R* is a hydrocarbylene group containing from 2 to about 10 carbon atoms, or mixtures thereof.

The invention also relates to improved coating compositions comprising a coating resin and a flow-improving amount of a polymer composition derived from (A) at least one acrylic ester (not a hydroxyalkyl acrylate) vinyl monomer or mixtures thereof, (B) at least one alpha-beta unsaturated carboxylic acid compound containing only one carboxylic acid group, and (C) at least one hydroxyalkyl acrylate. The coating compositions exhibit improved stain-resistance and recoatability.

18 Claims, No Drawings

POLYMER COMPOSITIONS USEFUL AS FLOW AIDS, AND COATING COMPOSITIONS CONTAINING THE POLYMER COMPOSITIONS

This is a continuation of copending application Ser. No. 07/498,014, abandoned, filed on Mar. 23, 1990, which is a division of application Ser. No. 07/272,073, filed Nov. 16, 1988, abandoned.

TECHNICAL FIELD

This invention relates to polymer compositions useful as flow aids for resin coating formulations. In particular, the invention relates to acrylic polymer compositions and to coating formulations containing the polymer compositions. The coating compositions containing the polymer compositions of the present invention exhibit improved properties, and in particular, stain-resistance and recoatability.

BACKGROUND OF THE INVENTION

Various types of liquid coating compositions have been applied to substrates such as metallic substrates and baked thereon in order to protect substrates against degradation and corrosion. The coatings deposited on the substrates must generally be sufficiently adherent and flexible to resist cracking, chipping and peeling. The coating also must be resistant to staining and soiling, and it is also desirable that the coated substrate be recoatable with one or more additional coatings. The ability of the initial coating to provide a good adhesive bond with the second and subsequent coatings is an important consideration when evaluating coating compositions.

A variety of resin materials have been utilized as coating compositions on various substrates, and the coating resins include polyester resins, acrylic resins, alkyd resins, vinyl resins, etc. The present invention relates particularly to coating compositions utilizing polyester or alkyd resins. Polyester and alkyd resin coating formulations will contain in addition to the resin, one or more pigments, pigment extenders, suspending agents, binders, thinners, dryers, vehicles, flow aids, etc., to improve application properties as well as to improve the appearance of the coating applied to various substrates. Many materials have been suggested in the prior art for use in polyester and alkyd resin coating compositions to improve the application properties and film appearance, and many of these can be utilized in the coating compositions of the present invention.

Flow aids are incorporated into coating compositions such as paint formulations to reduce surface defects in paint films and to contribute to a smooth, level, even, and uniform film. Film defects can be caused by air bubbles in the applied paint film, by dust, dirt, oil, or other contaminants in the film or on the substrate which, as a result of differences in surface tensions, cause the paint to pull away from the contaminant resulting in film defects known as "craters", or "fisheyes". Materials useful as flow aids function by migrating to the surface of a paint film after the film has been applied to a substrate where the flow aids lower surface tension so that air bubbles are broken and/or are capable of leaving the paint film, and when the surface tension of the paint film has been lowered by the flow aid, the paint does not pull away from contaminants thereby resulting in a smooth, level and generally defect-free coating.

Flow aids based on acrylic polymers have been utilized in the prior art. For example, Modaflow is a commercial acrylic flow aid available from Monsanto. This and other commercially available acrylic flow aids are effective in improving the surface characteristics of coatings such as paints, but in some instances, coatings and paints utilizing such acrylic flow aids have a tendency to attract and collect dirt thereby resulting in stains and generally unsatisfactory appearance. Moreover, coatings and paints containing some presently available acrylic flow aids are often characterized by unsatisfactory recoatability. Silicon-type flow aids, for example, are known for their poor recoatability.

Prior art acrylic polymer compositions which have been suggested as being useful as flow aids in various coating and paint formulations generally are soft, low $T_g$ (glass transition) polymers based on long chain acrylate or methacrylate esters such as butyl acrylate, lauryl methacrylate, stearyl methacrylate, 2-ethylhexyl acrylate, etc.

SUMMARY OF THE INVENTION

The present invention relates to polymer compositions which are useful particularly as flow aids in resin coating formulations. In one embodiment, the polymer composition is prepared by reacting (A) at least one acrylic ester, vinyl monomer or mixtures thereof, provided the acrylic ester is not a hydroxyalkyl acrylate, (B) at least one monoester of an alpha-beta unsaturated dicarboxylic acid, and (C) at least one hydroxy-containing compound selected from hydroxyalkyl acrylates and compounds characterized by the formula $$HOR^*SH \qquad (IIIA)$$

wherein $R^*$ is a hydrocarbylene group containing from 2 to about 10 carbon atoms, or mixtures thereof.

The invention also relates to improved coating compositions comprising a coating resin and a flow-improving amount of a polymer composition derived from (A) at least one acrylic ester, vinyl monomer or mixtures thereof, provided the acrylic ester is not a hydroxyalkyl acrylate, (B) at least one alpha-beta unsaturated carboxylic acid compound containing only one carboxylic acid group, and (C) at least one hydroxy-containing compound selected from hydroxyalkyl acrylates and compounds characterized by the formula $$HOR^*SH \qquad (IIIA)$$

wherein $R^*$ is a hydrocarbylene group containing from 2 to about 10 carbon atoms, or mixtures thereof.

DESCRIPTION OF THE PREFERRED EMBODIMENTS

In a first embodiment, the present invention relates to polymer compositions including acrylic polymer compositions and polymers obtained by polymerizing vinyl monomers such as styrene monomers. The polymer compositions of the present invention result from the polymerization of at least three copolymerizable monomers, namely, (A) at least one acrylic ester, vinyl monomer or mixtures thereof, provided the acrylic ester is not a hydroxyalkyl acrylate, (B) at least one alpha-beta unsaturated carboxylic acid compound containing only one carboxylic acid group, and (C) at least one hydroxy-containing compound selected from hydroxyalkyl acrylates and compounds characterized by the formula $$HOR*SH \qquad \text{(IIIA)}$$

wherein R* is a hydrocarbylene group containing from 2 to about 10 carbon atoms, or mixtures thereof. When component (A) is an acrylic ester, the polymer compositions are characterized herein as acrylic polymer compositions.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, alkyl, alkenyl, alkoxy, and the like, is intended to describe such groups which contain a total of up to 7 carbon atoms.

(A) Acrylic Ester, Vinyl Monomer or Mixtures Thereof

A variety of acrylic esters can be utilized as one of the components in the preparation of the acrylic polymer compositions of the invention. The acrylic esters may be represented by the formula $$CH_2=C(R)COOR^1 \qquad \text{(I)}$$

wherein R is hydrogen or a lower alkyl group, and $R^1$ is an alkyl group. As used in this specification and claims, the terms "lower alkyl" and "lower alkylene" include alkyl and alkylene groups containing from 1 to about 7 carbon atoms. Examples include methyl, ethyl, propyl, butyl, pentyl, hexyl and heptyl; methylene, ethylene, propylene, etc. In one embodiment, R is hydrogen, methyl or ethyl, and in another embodiment, $R^1$ is an alkyl group containing from 1 to about 24 carbon atoms. In a preferred embodiment R is H and $R^1$ is an alkyl group containing at least 4 carbon atoms up to about 24 carbon atoms. When preparing the acrylic polymers of the invention utilizing acrylic esters characterized by Formula I, more than one acrylic ester can be utilized as component (A).

Typical acrylic esters that can be used as component (A) in the preparation of the acrylic polymers are: methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, etc. As noted above, the alkyl acrylates of Formula I wherein the alkyl group contains at least 4 carbon atoms and R is H are preferred.

The vinyl monomers useful as component (A) in the preparation of the polymer compositions include vinyl aromatic compounds such as styrene and substituted styrenes including: methylstyrenes, such as m-methylstyrene, o-methylstyrene, p-methylstyrene; dimethylstyrenes such as 2,5-dimethylstyrene; halogenated styrenes such as m-bromostyrene, p-bromostyrene, p-iodostyrene, pentachlorostyrene; and alkoxystyrenes such as p-methoxystyrene. Other vinyl monomers include vinyl halides such as vinyl chloride, vinyl bromide; nitriles such as acrylonitrile, methacrylonitrile, etc. The vinyl monomer also may comprise vinyl esters such as vinyl acetate, vinyl propionate, vinyl stearate, etc.

(B) Alpha-Beta Unsaturated Carboxylic Acid Compound Containing Only One Carboxylic Acid Group A second essential component in the preparation of the polymer compositions useful in the present invention is at least one alpha-beta unsaturated carboxylic acid compound containing only one carboxylic acid group. Although it is desirable that the compound contain only one free carboxylic acid group, the compound (B) may contain carboxylic ester groups in addition to the carboxylic acid groups. The alpha-beta unsaturated carboxylic acid compound (B) may be characterized by the formulae $$CH_2=C(R)COOH \qquad \text{(IIA)}$$

or $$HOOCC(R^4)=C(R^4)COOR^3 \qquad \text{(IIB)}$$

wherein R is H or a lower alkyl group, $R^3$ is an alkyl group, and each $R^4$ is independently H or methyl with the proviso that at least one $R^4$ is H. In one embodiment, R is H, methyl or ethyl, and $R^3$ is an alkyl group containing from 1 to about 24 carbon atoms. In another embodiment, $R^3$ is a lower alkyl group and each $R^4$ is hydrogen.

Carboxylic acids of the type represented by Formula IIA are acrylic acids including acrylic acid, methacrylic acid, ethacrylic acid, etc. Examples of carboxylic acids represented by Formula IIB include methyl maleate, ethyl maleate, propyl maleate, butyl maleate, hexyl maleate, methyl itaconate, ethyl itaconate, methyl mesaconate, ethyl mesaconate, methyl glutaconate, ethyl glutaconate, etc.

(C) Hydroxy-Containing Compound

The third component utilized in the preparation of the polymer compositions is at least one hydroxy-containing compound. In one embodiment, the hydroxy-containing compound is at least one hydroxyalkyl acryl $$CH_2=C(R)C(O)OR^2OH \qquad (III)$$

wherein R is hydrogen or a lower alkyl group and $R^2$ is an alkylene group. Generally, the alkylene group will be a lower alkylene group, and more particularly is an alkylene group containing from 1 to about 4 carbon atoms. In one preferred embodiment, R is a methyl or ethyl group.

Examples of hydroxyalkyl acrylates useful as component (C) include: 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, 2-hydroxyethyl ethacrylate, 2-hydroxypropyl ethacrylate, etc.

In another embodiment, the hydroxy-containing compound contains an —SH group in addition to the —OH group and may be represented by the formula $$HOR^*SH \qquad (IIIA)$$

wherein $R^*$ is a hydrocarbyl group containing from 2 to about 10 carbon atoms, and the —OH and —SH groups are on different carbon atoms. The hydrocarbyl group may also include other atoms or groups such as carboxylic ester groups. Compounds represented by Formula IIIA are generally known in the art as chain-transfer agents.

Examples of hydroxy-containing compounds, as represented by Formula IIIA include: 2-mercaptoethanol, 1-mercapto-2-propanol, 3-mercapto-1-propanol, 3-mercapto-2-butanol, 2-hydroxyethyl-3-mercaptopropionate, etc. Mixtures of one or more hydroxyalkyl acrylate and one or more compounds of Formula IIIA can be utilized in the preparation of the polymers of the invention.

The molar ratio of the components (A), (B) and (C) used to form the polymers may vary over a wide range. Generally, the amounts may be within the general and preferred ranges set forth in Table I.

TABLE I

| Component | General Range (mole %) | Preferred Range (mole %) |
|---|---|---|
| (A) | 25–86 | 62–81 |
| (B) | 10–50 | 14–26 |
| (C) | 4–25 | 4–12 |

In one embodiment, the amount of carboxylic ester (B) included in the monomer mixture is an amount which is sufficient to provide a polymer having an acid value of from about 50 to about 150. The amount of hydroxyalkyl compound (C) included in the monomer mixture, in one embodiment is an amount sufficient to provide a polymer having a hydroxyl number of from about 20 to about 80.

Examples of some of the polymers of the present invention include polymerization products of the following mixtures:

| A | B | C |
|---|---|---|
| styrene | acrylic acid | 2-hydroxyethyl acrylate |
| ethyl acrylate | acrylic acid | 2-hydroxyethyl acrylate |
| butyl acrylate | acrylic acid | 2-hydroxypropyl methacrylate |
| lauryl methacrylate | monobutyl maleate | 2-hydroxyethyl methacrylate |
| butyl acrylate | monoethyl maleate | 2-hydroxypropyl ethacrylate |
| butyl acrylate | methacrylic acid | 2-hydroxybutyl methacrylate |
| butyl acrylate | monobutyl itaconate | 2-hydroxyethyl methacrylate |
| methyl methacrylate | ethyl mesaconate | 2-hydroxypropyl methacrylate |
| butyl acrylate | butyl maleate | 2-mercaptoethanol |

The preparation of the polymer compositions generally is effected in the presence of solvents including hydrocarbons, ketones, alcohols, esters, etc. Specific examples include toluene, ethyl acetate, mineral spirits, aromatic naphtha, acetone, methylisobutyl ketone, methylethyl ketone, ethyl alcohol, ethylene glycol monoether acetate, butoxyethanol, etc.

A polymerization catalyst generally is included in the mixtures used to form the desired polymers. About 0.1 to about 2% by weight or more, based on the combined weight of the monomers, of a polymerization catalyst is used to prepare the polymers. Any of the catalysts known in the art for polymerizing acrylic and vinyl monomers can be utilized in preparing the acrylic and vinyl polymers of the present invention. Typical catalysts include azo-bis-isobutyronitrile, benzoyl peroxide, acetyl peroxide, dicumyl peroxide, cumene hydroperoxide, ethyl 3,3-di(t-amylperoxy) butyrate, etc. Mixtures of such catalysts also can be used.

The following examples illustrate the preparation of acrylic polymer compositions of the present invention. Unless otherwise indicated, all parts and percentages are by weight, all temperatures are in degrees centigrade, and all pressures are at or near atmospheric. The viscosities are reported on the Gardner-Bubble (GB) scale (25° C.).

EXAMPLE 1

Into a resin reaction flask equipped with an agitator, a condenser, a thermometer and an inert gas inlet, there are charged 817 parts of butoxyethanol which is heated to 116° C. A premix of 317.3 parts of acrylic acid, 1467.6 of butyl acrylate, 198.4 parts of 2-hydroxyethyl methacrylate, and 39.3 parts of Vazo 64 (2,2'-azobis(2-methylpropanenitrile) is added over a 3-hour period while maintaining the reaction temperature at 106°–122° C. After the addition is complete, the solution is held at 109°–111° C. for one hour. There is then added 0.3 part of Vazo 64 and 50 parts of butoxyethanol, and the reaction mixture maintained at 110°–116° C. for 30 minutes to complete the polymerization. The polymer solution obtained in this manner contains 69.9% solids and has an acid value of 112.6, a viscosity of Z3-Z4, and a Gardner color rating of 1-2.

EXAMPLE 2

To a resin reaction flask as described in Example 1, there are added 285.8 parts of maleic anhydride, 237.6 parts of 1-butanol and 725.6 parts of Aromatic Naphtha 100. The mixture is heated to about 100° C., and the ensuing exotherm raises the temperature of the mixture to about 129° C. Heat is then applied to raise the reaction mixture to 140° C. where it is maintained for 20 minutes to complete the formation of monobutyl maleate.

To the reaction vessel there is added simultaneously, 36.9 parts of 2-mercaptoethanol and a premix consisting of 1052.2 parts of butyl acrylate, 127.1 parts of 2-hydroxyethyl methacrylate, 129.3 parts of lauryl methacrylate and 36.9 parts of dicumyl peroxide over a 3-hour period while maintaining the reaction temperature at 135°–145° C. After the additions are complete, the solution is maintained at about 137° C. for 20 minutes whereupon 12.3 parts of ethyl 3,3-di(t-amyl-peroxy) butyrate are added and the temperature is maintained at about 132°–139° C. to complete the polymerization. An additional 47.8 parts of Aromatic Naphtha 100 are added. The resulting polymer solution contains 69.4% solids and has an acid value of 80.7, a viscosity of T-U and a Gardner color of less than 1.

EXAMPLES 3-8

The general procedure of Example 1 is repeated using the reactants and amounts (mole percent) specified in the following Table II.

TABLE II

| Reactant/Example | 3 | 4 | 5 | 6 | 7 | 8 |
| --- | --- | --- | --- | --- | --- | --- |
| butyl acrylate | 70.0 | 65.9 | 71.4 | 59.7 | 62.8 | 63.2 |
| lauryl methacrylate | — | — | — | 4.6 | 2.3 | — |
| stearyl methacrylate | — | — | — | — | — | 1.8 |
| acrylic acid | 25.2 | 25.3 | 19.6 | 26.5 | 25.9 | 26.0 |
| hydroxyethyl acrylate | 4.8 | — | — | — | — | — |
| hydroxyethyl methacrylate | — | 8.8 | 9.0 | 9.2 | 9.0 | 9.0 |

EXAMPLES 9-16

The general procedure of Example 2 is repeated using the reactants and amounts (mole percent) specified in the following Table III.

TABLE III

| Reactant/Example | 9 | 10 | 11 | 12 | 13 | 14 | 15 | 16 |
| --- | --- | --- | --- | --- | --- | --- | --- | --- |
| butyl acrylate | 60.8 | 58.8 | 70.8 | 71.4 | 67.0 | 59.9 | 62.4 | 60.6 |
| lauryl methacrylate | — | 4.1 | 3.9 | — | — | 3.9 | 3.9 | 3.9 |
| stearyl methacrylate | — | — | — | 3.0 | 6.1 | — | — | — |
| styrene | 9.1 | — | — | — | — | — | — | — |
| butyl maleate | 23.8 | 26.0 | 14.6 | 14.8 | 15.5 | 25.1 | 22.5 | 24.9 |
| hydroxyethyl methacrylate | 6.3 | 11.1 | 10.7 | 10.8 | 11.4 | 7.5 | 7.6 | — |
| 2-mercaptoethanol | — | — | — | — | — | 3.6 | 3.6 | 10.6 |

The polymer compositions described above are useful as leveling agents and flow modifiers for coating resins, including thermoplastic and thermosetting resins such as polyester resins, alkyd resins, acrylic resins, polyurethane resins, vinyl resins, melamine resins, epoxy resins and phenolic resins. The polymer compositions are particularly useful in polyester resins and alkyd resins. Sufficient amounts of the polymer compositions should be incorporated into the coating formulation to improve the flow properties of the resins and to provide the desired properties in the coating, particularly, resistance to staining and recoatability. In general, the coating compositions will contain from about 0.1% to about 3% by weight of the polymer compositions. In a preferred embodiment, the coating compositions will contain from about 0.1% to about 2% by weight of the polymer.

The polyester resins that can be utilized in the present invention may be either saturated or unsaturated polyester resins formed by condensing a polycarboxylic acid or anhydride (either saturated or unsaturated) with at least one polyhydric alcohol. Illustrative of these polyester resins are the products of the reaction of a saturated dicarboxylic acid or anhydride such as phthalic acid or anhydride, isophthalic acid, tetrahydrophthalic anhydride, hexahydrophthalic anhydride, succinic acid, glutaric acid, adipic acid, pimelic acid, suberic acid, azelaic acid and sebacic acid, and an unsaturated dicarboxylic acid or anhydride such as maleic anhydride, fumaric anhydride, chloromaleic acid, itaconic acid, citraconic acid and mesaconic acid with a dihydric alcohol such as ethylene glycol, propylene glycol, butylene glycol, diethylene glycol, triethylene glycol, and neopentyl glycol. Small amounts of a polyhydric alcohol such as glycerol, pentaerythritol, trimethylolpropane, or sorbitol may be used in combination with the glycol.

Alkyd resins are the polymerization products of polyhydric alcohols and polybasic acids modified with monobasic fatty acids. Non-oil or oil-free alkyds, best described as saturated or hydroxylated reactive polyesters, are formed by the reaction of polybasic acids with excess polyhydric alcohols.

Alkyd resins generally are classified by alkyd ratio or polyhydric alcohol:phthalate ratio, oil length or percent oil for alkyds containing glycerol as the only polyol, and percent phthalic anhydride. Alkyds are roughly classified into four main types: short (30–42% fatty acid content, 38–46% phthalic anhydride content); medium (43–54% fatty acid content, 30–37% phthalic anhydride content); long (55–68% fatty acid content, 20–30% phthalic anhydride content); and very long (>68% fatty acid content, <20% phthalic anhydride content). The percentage of fatty acid content influences the properties of alkyd resins.

Among the polyhydric alcohols which can be used to prepare alkyd resins, glycerol is the most widely used followed by pentaerythritol. Polyols such as sorbitol and diethylene glycol also have been used.

Phthalic acid and isophthalic acid have been the most widely used polybasic acids in the preparation of alkyd resins.

In one embodiment, the alkyd resin and polyester resin formulations used in the present invention will also contain an unsaturated monomer capable of reacting with the alkyd resin or unsaturated polyester resin to form cross-linkages. The unsaturated monomers include vinyl or acrylate monomers, and these are incorporated into the formulations as reactive diluents. Suitable unsaturated monomers include styrene, methyl styrene, dimethyl styrene, vinyl toluene, divinyl benzene, dichloro styrene, methyl acrylate, ethyl acrylate, methyl methacrylate, ethyl methacrylate, diallylphthalate, vinyl acetate, acrylonitrile, acrylamide, vinyl chloride, vinylidine chloride, vinyl formate, vinyl acetate, vinyl butyrate, vinyl stearate, etc. Mixtures of such monomers such as methyl methacrylate and butyl acrylate, styrene and ethyl or butyl acrylate, or acrylonitrile and ethyl acrylate also may be utilized.

The alkyd and polyester resin formulations which are modified with one or more of the above unsaturated monomers may contain from about 20% to about 80% by weight of non-volatile material.

The coating resins utilized in the compositions of the present invention may be derived from at least one curable acrylic resin derived from acrylic acid, methacrylic acid, or esters of acrylic acid or methacrylic acid by techniques well known to those skilled in the art. Most acrylics are based on methyl methacrylate monomer which can be produced in a two-step process where acetone is reacted with hydrogen cyanide to form acetone cyanohydrin, and this intermediate is heated with methanol in the presence of an acid such as sulfuric acid to produce methyl methacrylate monomer. The acrylic resins may comprise homopolymers or copolymers of methyl methacrylate with other acrylates such as methyl or ethyl acrylate. The acrylic resins can be modified with various ingredients including butadiene, vinyl, and butyl acrylate to improve certain properties. Vinyl resins such as those derived from vinyl acetate, vinyl halides, etc., also can be utilized in the compositions of the present invention.

Examples of other thermosetting resins which can be utilized include polyurethane resins, melamine resins, epoxy resins, and phenolic resins. The epoxy resins contain a reactive functional group (oxirane ring) in their molecular structure. The epoxy resins utilized in the present invention may be any one of a number of well known resins, and many of these are available commercially from a variety of sources. As used in this specification and in the appended claims, the term "epoxy resin" is intended to describe the reaction products of the condensation reaction of an epihalohydrin and a hydroxy-containing compound or carboxylic acid. Thus, the epoxy resins may be of the ether or ester types.

Examples of ester-type epoxy resins include polyglycidyl esters obtained by the reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, etc.; from cycloaliphatic polycarboxylic acids such as tetrahydrophthalic acid; and from aromatic polycarboxylic acids such as phthalic acid, isophthalic acid, and terephthalic acid.

Ether-type epoxy resins are obtained by the reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions are generally complex mixtures of glycidyl polyethers. These ethers may be made from acyclic alcohols such as ethylene glycol, diethylene glycol, propane-1,2-diol, hexane-2,4,6-triol, glycerol, etc.; from cycloaliphatic alcohols such as bis(4-hydroxycyclohexyl) methane; and some alcohols having aromatic nuclei such as N,N-bis(2-hydroxyethyl) aniline, and p,p'-bis(2-hydroxyethylamino) diphenylmethane. The epoxy resins also may be derived from mononuclear phenols such as resorcinol or from polynuclear phenols such as bis(4-hydroxyphenyl) methane (otherwise known as bisphenol F), 4,4'-dihydroxydiphenyl, 2,2-bis(4-hydroxyphenyl) propane (otherwise known as bisphenol A), and 2,2-bis(3,5-dibromo-4-hydroxyphenyl) propane.

The most widely used epoxy resins are diglycidyl ethers of bisphenols, especially bisphenol A. These are made by reacting epichlorohydrin with bisphenol A in the presence of an alkaline catalyst. By controlling the operating conditions and varying the ratio of epichlorohydrin to bisphenol A, products of different molecular weight can be made. Other usable epoxy resins include the diglycidyl ethers of other bisphenol compounds such as bisphenol B, F, G and H.

Epoxy resins of the type described above based on various bisphenols are available from a variety of commercial sources. One group is known by the general trade designation "Epon" resins and are available from Shell Chemical Company. Another group of commercially available epoxy resins is identified under the general trade designation EPI-REZ from Celanese Resins, a division of Celanese Coatings Company.

The coating formulations of the present invention also may contain phenolic resins. Phenolic resins are the reaction products of phenol and formaldehyde. Polyurethanes sometimes referred to as urethanes, are also useful as coating resins. The polyurethanes generally are formed by the reaction of a polyisocyanate and a polyol. By varying the combinations of polyisocyanates and polyols, polyurethanes having a variety of desirable properties can be obtained. Two types of polyisocyanates are predominantly used to make polyurethanes, and these are diphenylmethanediisocyanate monomer (MDI) and its derivatives, and toluene diisocyanate (TDI) and its derivatives. The polyols most often used in the formation of polyurethanes are polyester polyols and polyether polyols.

Amino resins also can be utilized and these include, in particular, urea resins and melamine formaldehyde resins. Both urea and melamine can react with formaldehyde to initially form monomeric addition products. For example, a single molecule of urea readily combines with two molecules of formaldehyde to form dimethylol urea. As many as six molecules of formalde can add to a melamine molecule to form hexylmethylol melamine. These methylolated species can further condense in the presence of an acid catalyst to produce methylene or methylene ether linkages. Further condensation results in the formation of a variety of resins, and the particular resin characteristics can be obtained by control of pH, reaction temperature, reactant ratio, amino monomer and a degree of polymerization. The liquid coating resins commonly are prepared by reacting methanol or butanol with the initial methylolated products. These methylated and butylated resins can then be used to produce hard, solvent-resistant coatings by heating with hydroxyl, carboxyl and amide functional polymers.

In addition to the polymer compositions of the present invention, the coating formulations may also contain pigments, solvents, surface-active agents, bodying agents, extender pigments, plasticizing agents, etc., as is well known in the art.

The pigments utilized in the coating compositions include any of the known organic and inorganic pigments, whether natural or synthetic. Examples of organic pigments include the azo-insoluble pigments such as toluidines, naphtol reds, benzidines and dinitraniline orange; the acid azo pigments such as lithol, Persian orange and tartrazine; the phthalocyanine pigments such as phthalocyanine blues and greens; and the basic PNA and PTA pigments such as rhodamine, malachite green, methyl violet and victoria blue. Examples of inorganic pigments include metal flakes; the natural red oxide pigments; chromates such as lead chromate; zinc sulfide pigments such as zinc sulfide, lithopone, etc.; zinc oxide; antimony oxide; titanium pigments such as titanium dioxide, tinted titanium pigments; titanates such as barium, zinc, lead and magnesium titanate; pearlescent pigments such as mica which has been plated with a coating of titanium dioxide or iorn oxide, etc. All of these pigments are discussed in detail in Vol. II of *Organic Coating Technology*, "Pigments and Pigmented Coatings" by Henry F. Payne, John Wiley & Sons, Inc., New York, 1961. The ratio of pigment to resin in the coating composition will depend upon the usual factors considered in coating chemistry when determining such ratios. For example, the ratio is experimentally determined taking into consideration such desired properties as hiding power, cover, shade, flexibility, mechanical strength, consistency and flow properties.

Examples of surface-active agents can be utilized in the coating compositions of the invention include such materials as oleic and other organic acids; lecithin; hydrogenated castor oil; aluminum and calcium stearates; silicone oils; and pine oil. Bodying agents may be included to increase the consistency of the paint by producing a thixotropic condition. Metallic soaps have been used widely as bodying and anti-settling agents, and examples include the aluminum, zinc, magnesium, calcium and lead stearates.

Extender pigments are much lower in price than the prime pigments that are used in paints to reduce the cost and improve properties such as consistency, leveling and pigment settling. Extender pigments are obtained either by pulverizing certain rocks and sedimentary deposits, or by chemical precipitation. Aluminum silicates have been found to be particularly useful as extender pigments. Examples of plasticizing agents which may be included in the coating compositions include glycerine, glycerol, triphenyl phosphate, dibutyl phthalate, and dioctyl phthalate.

Cross-linking agents can be included in the coating compositions. For example, small amounts of alkylated melamine formaldehyde resin can be included in the coating compositions. The alkyl group contains from 1 to 4 carbon atoms, and the resin can be prepared by conventional techniques in which an alcohol such as methanol, ethanol, butanol, isobutanol, etc., is reacted with a melamine formaldehyde resin. The resin can be monomeric or polymeric. One preferred resin which results in a high quality finish is hexamethoxymethyl melamine which is available commercially as "Cymel 303" from American Cyanamid. Another example is a methoxybutoxymethyl melamine. About 1 to about 30% by weight of the cross-linking agent, based on the weight of polymer, can be included in the coating compositions.

The following examples illustrate coating compositions of the present invention.

EXAMPLE A

A coating composition is prepared by dispersing 33.15 parts of titanium dioxide in 17.82 parts of a polyester resin solution (65% solids) and 7.24 parts of butoxyethoxyethanol. The dispersion is let down with 22.7 parts of the same polyester resin solution, 4.25 parts of hexamethoxymethyl melamine (Cymel 303), 0.5 part of the acrylic polymer of Example 1, 3.10 grams of butoxyethoxyethyl acetate, 2.1 parts of 2-ethylhexanol, 8.8 parts of 100/aromatic solvent, 0.14 part of p-toluene sulfonic acid and 0.2 part of petroleum wax.

EXAMPLE B

A coating composition as prepared in accordance with the formulation of Example A except that 0.5 part of the acrylic polymer of Example 2 is utilized in lieu of the product of Example 1.

The coating compositions of this invention can be applied over a variety of substrates such as metal, wood, glass, plastics, and the like, by any of the conventional application methods such as by spraying, electrostatic spraying, dipping, brushing, flow-coating, roller coating, etc. The viscosity of the coating composition can be adjusted for any one of these methods by adding solvents if necessary.

The coatings are cured by baking at temperatures of from about 150°–250° C. for periods of from about 10 seconds up to about 4 or 5 minutes or more. Coating thicknesses from about 0.5 to about 5 mils are usually satisfactory.

The utility of the coating compositions of the present invention, and any of the improvements obtained are illustrated in the following example.

The coating composition prepared in Example A is applied to aluminum panels to yield 0.7 to 0.9 mil dry films and the films are cured by baking for 30 to 35 seconds at 215°–232° C. The resulting films are glossy, solvent-resistant and flexible. The films resist staining by a variety of materials and are recoatable.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A coating composition consisting essentially of a curable thermosetting or thermoplastic resin and a flow-improving amount, sufficient to lower the surface tension of the coating such that the coating does not pull away from contaminants and thereby gives a smooth, level and generally defect-free coating, of a polymer composition derived from monomers consisting of
    (A) at least one acrylic ester, vinyl monomer or mixtures thereof, provided the acrylic ester is not a hydroxyalkyl acrylate,
    (B) at least one alpha-beta unsaturated carboxylic acid compound containing only one carboxylic acid group, and (C) at least one hydroxy-containing compound selected form hydroxyalkyl acrylates and compounds characterized by the formula

HOR*SH wherein R* is a hydrocarbylene group containing from 2 to about 10 carbon atoms, or mixtures thereof.

2. The coating composition of claim 1 which comprises a thermosetting resin.

3. The coating composition of claim 1 which comprises a curable polyester or alkyd resin.

4. The coating composition of claim 1 which comprises a curable polyester resin.

5. The coating composition of claim 1 which comprises from about 0.1 to about 3% by weight of the polymer composition.

6. The coating composition of claim 1 wherein (A) is at least one acrylic ester characterized by the formula $$CH_2=C(R)COOR^1 \qquad (I)$$

wherein R is hydrogen or a lower alkyl group, and $R^1$ is an alkyl group containing from 1 to about 24 carbon atoms.

7. The coating composition of claim 1 wherein (A) comprises a mixture of at least two acrylic esters characterized by the formula $$CH_2=C(R)COOR^1 \qquad (I)$$

wherein R is hydrogen or a lower alkyl group, and $R^1$ is an alkyl group containing from 4 to about 24 carbon atoms.

8. The coating composition of claim 1 wherein (A) is a styrene monomer.

9. The coating composition of claim 1 wherein the alpha-beta unsaturated carboxylic acid compound (B) is characterized by the formulae $$CH_2=C(R)COOH \qquad (IIA)$$

or $$HOOCC(R^4)=C(R^4)COOR^3 \qquad (IIB)$$

wherein R is H or a lower alkyl group, $R^3$ is an alkyl group containing from 1 to about 24 carbon atoms, and each $R^4$ is independently H or methyl with the proviso that at least one $R^4$ is H.

10. The coating composition of claim 9 wherein $R^3$ is a lower alkyl group, and each $R^4$ is H.

11. The coating composition of claim 1 wherein (C) is at least one hydroxyalkyl acrylate.

12. The coating composition of claim 11 wherein the hydroxyalkyl acrylate (C) is characterized by the formula $$CH_2=C(R)C(O)OR^2OH \qquad (III)$$

wherein R is hydrogen or a lower alkyl group, and $R^2$ is an alkylene group.

13. The coating composition of claim 12 wherein $R^2$ is an alkylene group containing from 1 to 3 carbon atoms.

14. The coating composition of claim 12 wherein R is a methyl or ethyl group.

15. A coating composition consisting essentially of a curable polyester or an alkyd resin containing from about 0.1 to about 3% by weight of an acrylic polymer derived from monomers consisting of
(A) from about 25 to about 86 mole percent of at least one acrylic ester characterized by the formula $$CH_2=C(R)COOR^1$$

wherein R is hydrogen or a lower alkyl group, and $R^1$ is an alkyl group containing from 4 to about 24 carbon atoms,
(B) from about 10 to about 50 mole percent of at least one alpha-beta unsaturated carboxylic acid compound containing only one carboxylic acid group and characterized by the formula $$CH_2=C(R)COOH$$

or $$HOOCH=CHCOOR^3$$

wherein R is hydrogen or a lower alkyl group, and $R^3$ is a lower alkyl group, and
(C) from about 4 to about 25 mole percent of at least one hydroxyalkyl acrylate characterized by the formula $$CH_2=C(R)C(O)OR^2OH$$

wherein R is hydrogen or a lower alkyl group, and $R^2$ is an alkylene group containing from 1 to 3 carbon atoms.

16. The coating composition of claim 15 wherein (B) is present in an amount sufficient to provide an acrylic polymer having an acid value of from about 50 to about 150.

17. The coating composition of claim 15 wherein the resin is a polyester resin.

18. The coating composition of claim 15 wherein the acrylic ester (A) is a mixture comprising butyl acrylate and lauryl methacrylate.

* * * * *

UNITED STATES PATENT AND TRADEMARK OFFICE
CERTIFICATE OF CORRECTION

PATENT NO. : 5,262,482

DATED : November 16, 1993

INVENTOR(S) : Marc L. Smith; Geoffrey R. Holzrichter; Edward J. Holzrichter; Leslie P. Walkeapaa It is certified that error appears in the above-identified patent and that said Letters Patent is hereby corrected as shown below:

Column 5, line 11, after "acryl" insert ---ate which may generally be represented by the formula--

Column 10, line 45, change "formalde" to --formaldehyde--

Signed and Sealed this

Thirtieth Day of August, 1994

Attest:

BRUCE LEHMAN

Attesting Officer

Commissioner of Patents and Trademarks